Dec. 25, 1923.

C. F. RUBSAM 1,478,581

DETACHABLE RIM

Original Filed Nov. 30, 1917   3 Sheets-Sheet 1

Charles F. Rubsam Inventor

By his Attorneys
Emery, Booth, Janney and Varney

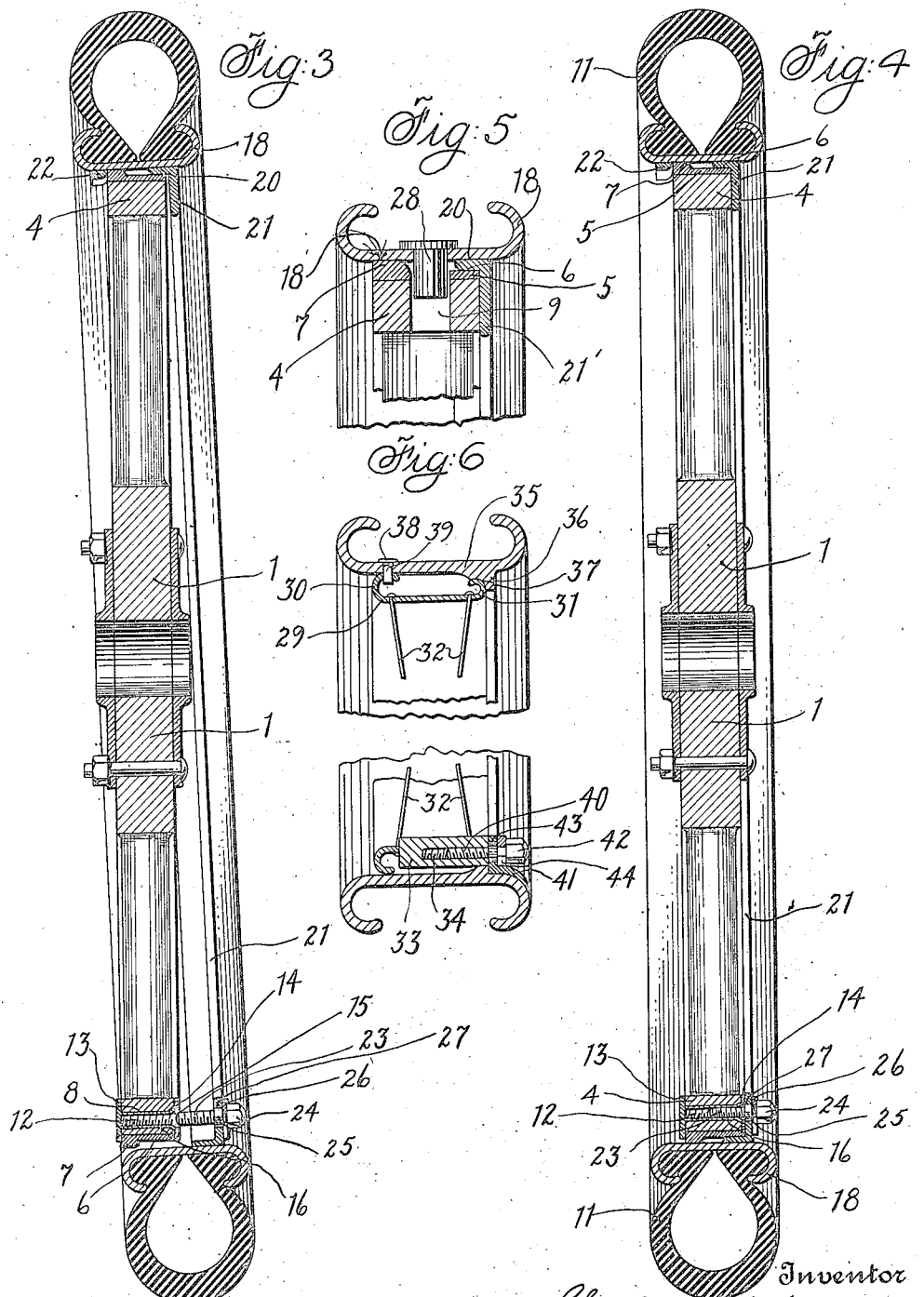

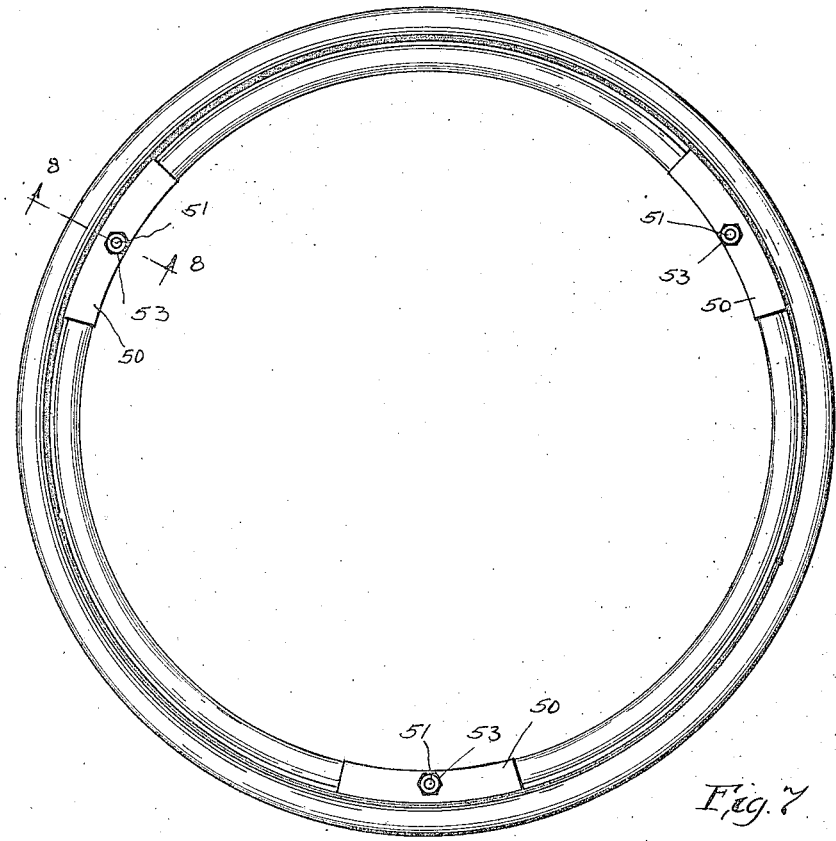
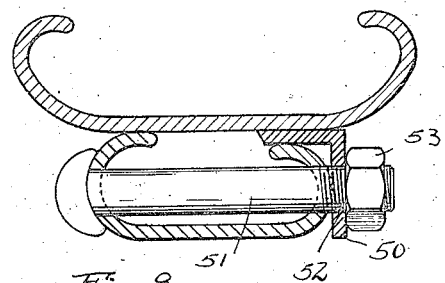

Patented Dec. 25, 1923.

1,478,581

UNITED STATES PATENT OFFICE.

CHARLES F. RUBSAM, OF BROOKLYN, NEW YORK.

DETACHABLE RIM.

Application filed November 30, 1917, Serial No. 204,655. Renewed August 14, 1922. Serial No. 581,837.

*To all whom it may concern:*

Be it known that I, CHARLES FERDINAND RUBSAM, a citizen of the Republic of France, and a resident of the borough of Brooklyn, city, county, and State of New York, have invented an Improvement in Detachable Rims, of which the following is a specification.

My invention relates to improvements in detachable rims for the wheels of automobiles or similar road vehicles. The purpose of my invention is to provide a detachable rim which shall have a tight fit on the wheel body of the vehicle to which it is applied. By my invention, I provide means whereby the detachable rim is applied to the wheel body by a swinging movement, rather than by the axial movement hitherto customary in the use of detachable rims.

It is known in the art to which my invention relates, to apply a detachable rim to a wheel so that the rim has a tight fit on the wheel. Such a construction, however, involves the use of a plurality of bolts and clamps to apply the rim to the wheel, and the construction hitherto in use is such as to render it difficult to remove the rim from the wheel when once applied thereto. It is also known in the art to apply a rim to a wheel, the internal diameter of the rim being substantially larger than the external diameter of the felly of the wheel to which the same is applied, the clearance space between the two afterwards being partly filled by means of wedges or substantially completely filled by means of a wedging ring. These structures have obvious disadvantages and render the rim difficult to attach and detach.

By my invention I am enabled to avoid the aforesaid difficulties and to provide a structure wherein the rim is easily applied and detached. The rim of my invention furthermore is provided with means co-operating with the wheel to which it is to be applied, whereby the rim is first applied to the wheel in such a position that the rim may be swung about a portion of the wheel as a pivot into position on said wheel, means being provided for rendering the swinging movement in one direction to apply the rim, and in the reverse direction to detach the rim, easy and convenient.

My invention further relates to details of construction hereinafter described with reference to the accompanying drawings, wherein—

Figure 3 is a cross section of the wheel and detachable rim before the rim has been placed in position on the wheel, taken on line A—A of Figure 2.

Figure 4 is a similar view of the wheel and rim after the rim is in position on the wheel;

Figure 5 is a cross section of a modification taken at a point of the rim corresponding to the valve of the tire; Figure 6 is a fragmentary sectional view of a further modification.

Figure 7 is an elevational view of another modification and Figure 8 is a sectional view on the line 8—8 of Figure 7.

Similar reference characters refer to similar parts throughout the several views of the drawings.

Figure 1:
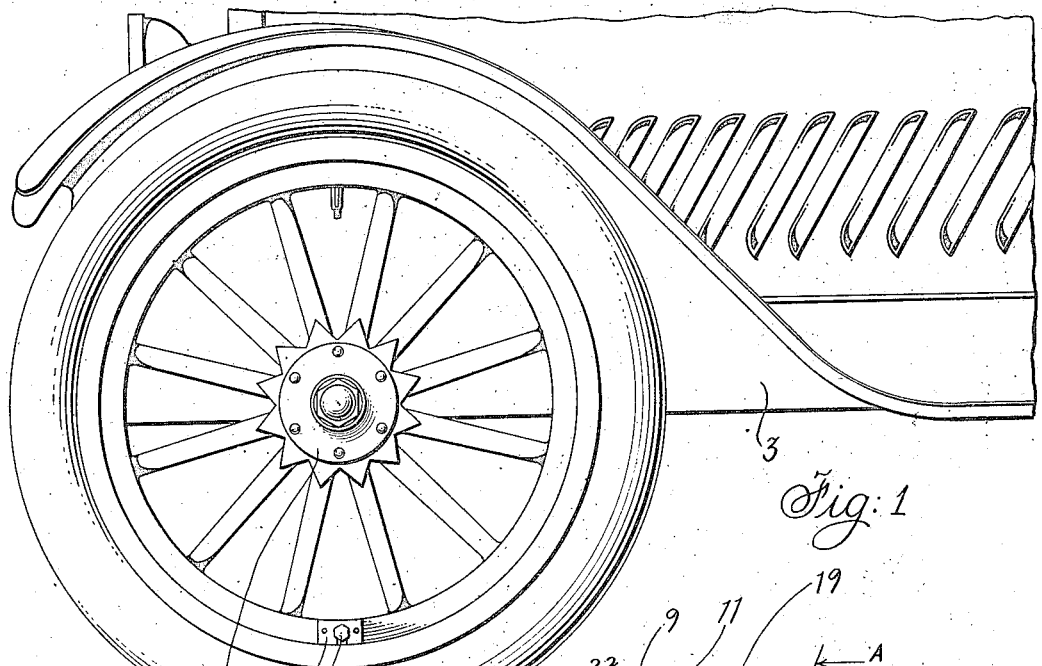
Figure 1 is an elevational view of the rim and associated tire in position on the wheel, this view being taken of that side of the wheel which is remote from the vehicle.

1 is the wheel mounted on the axle 2 of the automobile or other vehicle 3. The wheel 1 has the peripheral portion or felly 4. While the outer surface of the felly 4 may have various forms under my invention, so long as the same is adapted to have a tight fit at a plurality of points of contact with the inner surface of the rim which is to be applied thereto, I prefer to provide such outer edge of the felly 4 with the felly band 5 providing the substantial cylindrical surface 6 and having the raised step or portion 7. Passing through a transverse opening 8 in a portion of the felly, preferably but not necessarily located substantially opposite to the radial opening 9 in the felly, which is for the purpose of admitting the valve 10 of the tire 11, is the threaded socket 12. For the purpose of giving the threaded socket 12 the necessary mechanical strength to withstand the strain put upon it, I prefer to provide said socket with the extensions or flanges 13 which bear against that side of the felly which is nearer to the vehicle and provide the other side of the felly with the plate 14 having an aperture 15 corresponding with the threaded aperture 16 of the socket 12. A plurality of bolts or other similar means 17 are provided passing through the felly to bind the flanges 13 with the plate 14, so as to properly position the threaded socket 12 in place in the aperture 8 of the felly.

The rim 18 on which the tire 11 is located is provided with the usual aperture 19 for permitting passage of the valve 10 therethrough. Riveted, welded or otherwise securely fastened to the inner face of the rim 18 is the raised or step portion 20 to which is integrally or otherwise securely attached an inwardly extending flange 21. This flange extends substantially entirely or entirely about the rim. The flange 21 is located at that side of the rim which is remote from the vehicle when the rim is in position on the wheel. At the other side of the rim that is, at the side which is adjacent to the vehicle when the rim is in position on the wheel, are one or more lugs 22 securely attached to said rim as by welding, riveting, or other suitable means. If desired such lugs may be made integral with the rim as by stamping or otherwise forming the same on said rim during the manufacture of the same. While any number of such lugs or projections 22 may be provided, I prefer to provide the rim with two such lugs, preferably so spaced that one lug will be on each side of the valve opening of the rim 18. Passing through a portion of the flange 21, preferably but not necessarily at a point of said flange which is substantially opposite the valve opening 19 of the rim 18, is the threaded bolt 23 which is rotatably held in position in the flange 21, between the head 24 of the bolt and the collar 25 spaced from such head, by means of the slotted plate 26 attached to the flange 21 and located between the head 24 of the bolt and the flange 21. The collar 25 is so positioned as to bear within the aperture 27 in the flange 21. Preferably the bolt 23 has sufficient free space within its bearing so that it may readily enter the threaded socket 16 of the member 12.

The manner of applying the rim to the wheel is as follows: The rim is first applied to the wheel so that the valve member 10 may pass through the radial aperture 9 in the felly of the wheel. In this position, which is illustrated in Figure 3, a portion of the wheel will be located between the lug or lugs 22 and the flange member 21, and the threaded bolt 25 will be in position to enter the first thread of the threaded socket 16. It will be noted that upon operating the bolt 25 to cause the same to work into the socket 16 the rim will be forced by a pivotal or swinging movement about that portion of the wheel which is adjacent to the lugs 22 into position on the wheel and into tight engagement therewith. As the bolt 23 is screwed more and more into the socket 16 the rim makes contact with the outer edge of the wheel along an increasingly greater area, and when the rim is positioned on the wheel there is substantial contact between the rim and the wheel along the outer faces of the raised portions 7 and 20 with the corresponding cylindrical surfaces 18' and 6 respectively. To detach the rim all that is necessary is to operate the bolt 23 in the reverse direction whereby a reverse pivotal or swinging movement is brought about which detaches the rim from the wheel.

Figure 2:
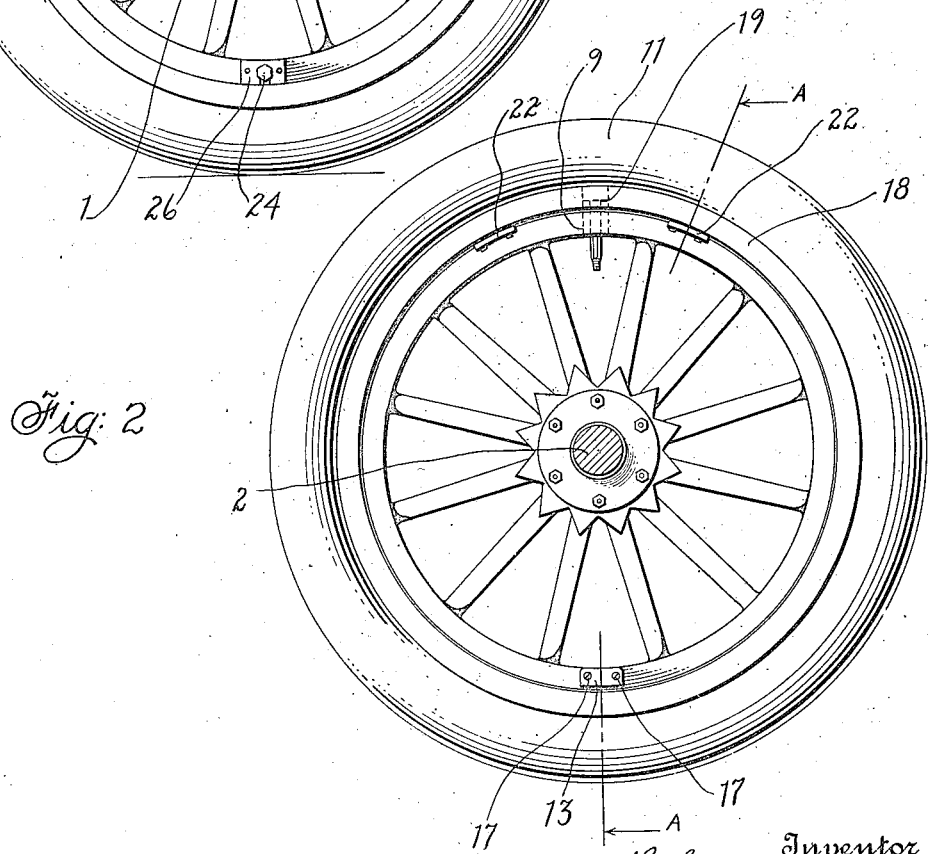
Figure 2 is a view similar to Figure 1, but taken on that side of the wheel which is nearer to the vehicle.

From the above description it is clear that the essential point is to provide means associated with the rim and the wheel whereby the rim may be forced on to the wheel by a swinging or pivotal movement about a portion of the wheel. In order to provide such a pivot I may use other means than those illustrated in Figures 1 to 4, and I intend that the claims shall cover such other means. In Figure 5 I have illustrated a modification wherein the desired result is brought about by omitting the lugs 22 and substituting as an equivalent means therefor the collar 28 which is welded or otherwise fixed in the valve aperture of the rim. The internal diameter of the collar 28 is such as to freely admit the valve of the tire. In this modification it is clear that the rim will be held in position on the wheel between the flange member 21' and the collar 28, enough clearance being provided between the collar 28 and the valve aperture in the felly of the wheel to permit the necessary pivotal or swinging movement.

While I have shown the raised portions or steps 7 and 20 as provided with substantially cylindrical surfaces, for co-operating with the substantially cylindrical surfaces 18' and 6 respectively, it is to be understood that any character of co-acting surfaces may be employed providing the dimensions of such surfaces are such that the rim will have a substantially tight fit on the wheel when in position thereon.

It is to be noted that, as illustrated, the lower edge of the outer plate of member 12, as well as the corresponding edge of the plate 14, bears against the edge of the felly band 5, which therefore functions to take up the strain due to the operation of the threaded bolt 23 and to distribute such strain along the whole extent of the felly band and associated wheel. This construction serves to give the device of my invention the necessary mechanical strength. Furthermore the bolt 23 which passes through the flange 21 of the rim and the wheel body, also provides a very substantial driving lock for the detachable rim It is to be understood that while the rim is adapted and intended to have a tight fit at a plurality of points on the felly band of the wheel, the dimensions of the various parts are so chosen as to permit the rim to be forced on to the felly without too great a strain on the various parts of the device. In order to further facilitate a proper interengagement of the rim with the wheel, I may, as shown, round off the inner edges of the raised portions 7 and 20 respectively. It is also to be understood that I may provide the flange 21 or 21' along portions only of the rim 18 as illustrated in Figures 7 and 8, where the rim is provided with flange portions 50, the wheel body being provided with bolts 51 adapted to pass through suitable apertures 52 in these flange portions. Nuts 53 are employed to force the flange portions inwardly to secure the rim to the wheel body. The bolts 51 and the nuts 53 are of the usual type employed in wheel construction and are thus merely illustrative of conventional fastening means.

In the modification illustrated in Figure 6, the wheel comprises a felly rim or fixed rim 29 having the curving upturned portions 30 and 31. The wheel may be either a wire wheel, as shown, provided with the wire spokes 32, or, if desired, the wheel may have wooden spokes attached in any suitable manner to the felly rim 29. Fixed within a suitable portion of the member 29, is the socketed member 33, internally screw threaded, as at 34. The tire rim 35 is provided with the flange 36 recessed as at 37, to co-operate with the upturned portion 31. Fixedly secured to the rim 35, as by welding, is the inwardly extending pin 38 co-operating with the aperture 39 in the upturned member 30. Co-operating with the socketed member 33 is the bolt 40 rotatably held in position within the member 41, attached to or integral with the tire rim 35, between the head 42 and the fixed collar 43 of the bolt 40, by means of the slotted plate 44. In the form shown at the bottom of Fig. 6 the preferred method of attaching the member 41 is illustrated, this consisting in cutting away a portion of the flange 36 to form a recess in which the member 41 is placed, the member being aligned with the recessed portion 37 of the flange 36 shown in the top part of Fig. 6 and being then welded or otherwise fixedly secured to the flange 36 and the outside of the tire rim. In this construction the pin 38 affords the means whereby the tire rim 35 may be swung into position on the wheel, the engagement of the nut 40 with the socketed member 33 forcing the rim on to the wheel, the members 30 and 31 yielding sufficiently to permit effective engagement of the rim with the wheel.

It will be noted that on one side of the medial vertical plane passing through the wheel, that is, on the side nearer the vehicle, the felly band has a raised substantially cylindrical bearing surface cooperating with a substantially cylindrical bearing surface on the rim; while on the other side of said plane, that is, on the side remote from the vehicle, the rim has a raised substantially cylindrical bearing surface on the felly band. There is, therefore, a plurality of cooperating substantially cylindrical bearing surfaces on each side of the medial vertical plane referred to.

Throughout the specification and claims, wherever the term "cylindrical" is employed, I mean to designate thereby any desired width of bearing surface down to an edge.

The bolt 40 and the pin 38 act together in this construction to form a driving lock for the detachable rim and the present construction is applicable to vehicle wheels formed with a felly and a felly band or to vehicle wheels of the fixed rim type and the present constructions are merely illustrative of certain of the many combinations which may be employed in wheel and rim construction.

What I claim is:

1. In combination, a wheel body, a detachable rim for said wheel body adapted to have a substantially tight fit with the same substantially throughout the entire circumferential extents of said rim and wheel body when said rim is in position on said wheel body, interengaging means on the rim and wheel body providing a pivotal point about which the rim is swung into position on the wheel body, and means applied to another portion of said rim for swinging the same into position on said wheel body.

2. In combination, a wheel body provided with a substantially cylindrical bearing surface, a detachable rim for said wheel body also provided with a substantially cylindrical bearing surface cooperating with said first mentioned bearing surface and adapted to have a substantially tight fit with the same substantially throughout the entire circumferential extents of said rim and wheel body when said rim is in position on said wheel body, interengaging means on the rim and wheel body providing a pivotal point about which the rim is swung into position on the wheel body, and means applied to another portion of said rim for swinging the same into position on said wheel body.

3. In combination, a wheel body provided with a plurality of substantially cylindrical bearing surfaces, a detachable rim for said wheel body also provided with a plurality of substantially cylindrical bearing surfaces cooperating with said first mentioned bearing surfaces, said rim being adapted to have a substantially tight fit with said wheel body at the meeting surfaces of said substantially cylindrical bearing surfaces, when said rim is in position on said wheel body, interengaging means on the rim and wheel body providing a pivotal point about which the rim is swung into position on the wheel body, and means applied to another portion of said rim for swinging the same into position on said wheel body and for detaching the rim from said wheel body by a reverse swinging movement, at least one of each of said pluralities of bearing surfaces being raised and such raised bearing surfaces being on opposite sides of the vertical plane passing through the medial portion of said wheel body.

4. In combination, a wheel body provided with a substantially cylindrical bearing surface, a detachable rim for said wheel body also provided with a substantially cylindrical bearing surface cooperating with said first-mentioned bearing surface and adapted to have a substantially tight fit with the wheel body at the meeting surfaces of said cooperating bearing surfaces when said rim is in position on said wheel body, and means associated with a portion of said rim whereby the same may be so positioned on the wheel body as to permit said rim to be swung about said wheel body as a pivot into position on said wheel, at least one of said bearing surfaces being raised and both of said surfaces lying on the same side of the vertical plane passing through the medial portion of the wheel body.

5. In combination, a wheel body, a detachable rim for said wheel body adapted to have a substantially tight fit with the felly substantially throughout the entire circumferential extents of said rim and wheel body when said rim is in position on said wheel body, means associated with a portion of said rim whereby the same may be so positioned on the wheel body as to permit said rim to be swung about said wheel body as a pivot into position on the same, means applied at another portion of said rim for swinging the same into position on the wheel body, and means associated with said wheel body and rim for preventing lateral displacement of said rim when the latter is in position on the wheel body.

6. In combination, a wheel body provided with a substantially cylindrical bearing surface, a detachable rim for said wheel body also provided with a substantially cylindrical bearing surface cooperating with said first-mentioned bearing surface and adapted to have a substantially tight fit with the wheel body at the meeting surfaces of said cooperating bearing surfaces when said rim is in position on said wheel body, means associated with a portion of said rim whereby the same may be so positioned on the wheel body as to permit said rim to be swung about said wheel body as a pivot into position on the same, means applied at another portion of said rim for detaching the same from said wheel by a swinging movement, and means associated with said wheel body and rim for preventing lateral displacement of said rim when the latter is in position on the wheel body.

7. In combination a wheel body, a detachable rim for said wheel body, having an integral flange on its inner periphery and being adapted to have a substantially tight fit on the body when the rim is in position thereon, said flange having a portion cut away to form a recess and means to hold the rim on the body comprising a member mounted in said recess and fixedly secured to the inner periphery of the rim and means for securing the member on the body.

8. In combination a wheel body, a detachable rim for said wheel body, having an integral flange on its inner periphery and being adapted to have a substantially tight fit on the body when the rim is in position thereon, said flange having a portion cut away to form a recess and means to hold the rim on the body comprising a lug fitting in said recess and fixedly secured to the inner periphery of the rim, and a bolt passing thru said member.

In testimony whereof, I have signed my name to this specification this 28th day of November, 1917.

CHARLES F. RUBSAM.